US006804823B2

(12) United States Patent  
Poole et al.

(10) Patent No.: US 6,804,823 B2
(45) Date of Patent: Oct. 12, 2004

(54) PROTECTIVE COVER FOR OPTICALLY READ DIGITAL DISKS

(75) Inventors: Daniel L. Poole, Glendale, AZ (US); Robert N. Poole, Scottsdale, AZ (US)

(73) Assignee: D-Skin LLC, West Chicago, IL (US)

( * ) Notice: Subject to any disclaimer, the term of this patent is extended or adjusted under 35 U.S.C. 154(b) by 64 days.

(21) Appl. No.: 10/262,780

(22) Filed: Oct. 2, 2002

(65) Prior Publication Data

US 2004/0066733 A1 Apr. 8, 2004

(51) Int. Cl.$^7$ .............................................. G11B 23/03
(52) U.S. Cl. ...................................................... 720/725
(58) Field of Search ................................ 369/291, 290; 206/308.1; 720/725, 719, 727, 728

(56) References Cited

U.S. PATENT DOCUMENTS

| 4,278,258 A | * | 7/1981 | Fujita et al. ............. 369/26.01 |
| 4,499,996 A | * | 2/1985 | Coyle .......................... 360/133 |
| 4,672,600 A | | 6/1987 | Balston et al. |
| 5,774,447 A | * | 6/1998 | Shtipelman et al. ........ 369/291 |
| 5,787,069 A | | 7/1998 | Lowe et al. |
| 5,912,875 A | | 6/1999 | Lowe et al. |
| 6,054,009 A | | 4/2000 | Cote et al. |
| 6,077,583 A | | 6/2000 | Park |
| 6,192,025 B1 | | 2/2001 | Chen |
| 6,249,509 B1 | | 6/2001 | Hirata et al. |
| 6,309,727 B1 | | 10/2001 | Mueller et al. |
| 2004/0001425 A1 | * | 1/2004 | Poole et al. ................ 369/291 |

FOREIGN PATENT DOCUMENTS

| EP | 252226 A1 | * | 1/1988 | ........... G11B/23/03 |
| FR | 2576703 A | * | 8/1986 | ........... G11B/23/03 |

* cited by examiner

Primary Examiner—William Klimowicz
(74) Attorney, Agent, or Firm—Parsons & Goltry; Robert A. Parsons; Michael W. Goltry

(57) ABSTRACT

A protective cover for protecting a read side of an optical disk, including a circumferential frame for receiving and engaging the optical disk and a shield. The frame includes a continuous end wall, an annular base extending radially inwardly from a lower edge of the end wall and a plurality of spaced apart tabs extending radially inwardly from an upper edge of the end wall for engaging an upper surface of an optical disk. The shield is transparent and has an inner edge defining a central opening, an outer edge and a generally planar annular surface extending between the outer edge and the inner edge. The shield is carried by the annular base for receiving and covering the read side of the optical disk.

11 Claims, 3 Drawing Sheets

PROTECTIVE COVER FOR OPTICALLY READ DIGITAL DISKS

FIELD OF THE INVENTION

This invention relates to data storage devices.

More particularly, the present invention relates to protecting data storage devices.

In a further and more specific aspect, the instant invention concerns protective covers for optically read disks.

BACKGROUND OF THE INVENTION

Disks which are read optically store digital data in the form of microscopic pits on a bottom surface thereof. These disks include CDs, CD-ROM, CD-RW, DVDs etc. The encoded data is read using a laser which is typically projected through a transparent protective surface integrally formed on the lower surface of the disk. Damage or contamination of the protective surface can result in distortion of the read data.

To prevent damage to the disks protective covers have been developed. Many of the protective covers must be removed before the disk can be read. This is a substantial inconvenience and provides a window of time, just prior to insertion into a reading device, when damage can occur. To overcome this problem, covers have been developed which are intended to be kept in place when reading the disk. While this is a desirable goal, the protective covers have many problems.

As an example, a prior art cover includes several clips spaced around the periphery thereof to receive and engage the outer periphery of a disk. The cover is formed of a single unitary structure. The cover is necessarily very flimsy, as it must be very thin to permit access to the data. The flimsy nature of the cover, and specifically the clips, prevents a secure engagement with a disk, resulting in the cover easily disengaging the disk. In order to provide the rigidity sufficient to allow a secure attachment, the cover must be of a thickness which inhibits reading of data on the disk. In particular, DVD disks are greatly affected by covers. DVDs include two layers which must be read. One layer is a video layer and the other is an audio layer. An additional layer can prevent reading data from the deeper layer.

Additionally, the disks are often difficult to position in a read device, and are often caught or snagged when inserted into automatic feed readers, resulting in malfunctions. Another cover includes a sheet material having two sided tape positioned on an inner portion around a central opening. The tape adheres the inner edge of the cover to the disk. Again, when inserting the disk and cover into an automatic feed device, such as a automotive CD player, the loose outer edge of the cover can catch on the inlet of the device. This can jam the player, fold or otherwise damage the cover and prevent reading of the data on the disk.

It would be highly advantageous, therefore, to remedy the foregoing and other deficiencies inherent in the prior art.

Accordingly, it is an object of the present invention to provide a new and improved protective cover for an optically read disk.

Another object of the invention is to provide a protective cover which can remain in position during reading of the data stored thereon.

And another object of the invention is to provide a protective cover which can be used on substantially any disk.

Still another object of the present invention is to provide a protective cover which is easily installed and replaced.

Yet another object of the present invention is to provide a cover which is sufficiently thin to allow reading of data from a disk while having rigidity sufficient for a secure attachment.

SUMMARY OF THE INVENTION

Briefly, to achieve the desired objects of the instant invention in accordance with a preferred embodiment thereof, provided is a protective cover for protecting a read side of an optical disk including a circumferential frame for receiving and engaging the optical disk and a shield. The frame includes a continuous end wall having an upper edge and a lower edge, an annular base extending radially inwardly from the lower edge and a plurality of spaced apart tabs extending radially inwardly from the upper edge for engaging an upper surface of an optical disk. The shield is transparent and has an inner edge defining a central opening, an outer edge and a generally planar annular surface extending between the outer edge and the inner edge. The shield is carried by the annular base for receiving and covering the read side of the optical disk.

In a further embodiment, the cover is in combination with an optical disk. The optical disk includes an outer edge, a center hole, an upper surface and a readable surface having a readable portion intermediate the outer edge and the center hole. The protective cover removably covers the readable surface of the optical disk. The protective cover includes a circumferential frame including a continuous end wall having an upper edge and a lower edge, an annular base extending radially inwardly from the lower edge and a plurality of spaced apart tabs extending radially inwardly from the upper edge and overlying and engaging the upper surface of the disk. The cover further includes a shield that is transparent and has an inner edge defining a central opening, an outer edge and a generally planar annular surface extending between the outer edge and the inner edge. The shield is carried by the annular base and carrying and covering the read side of the optical disk.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
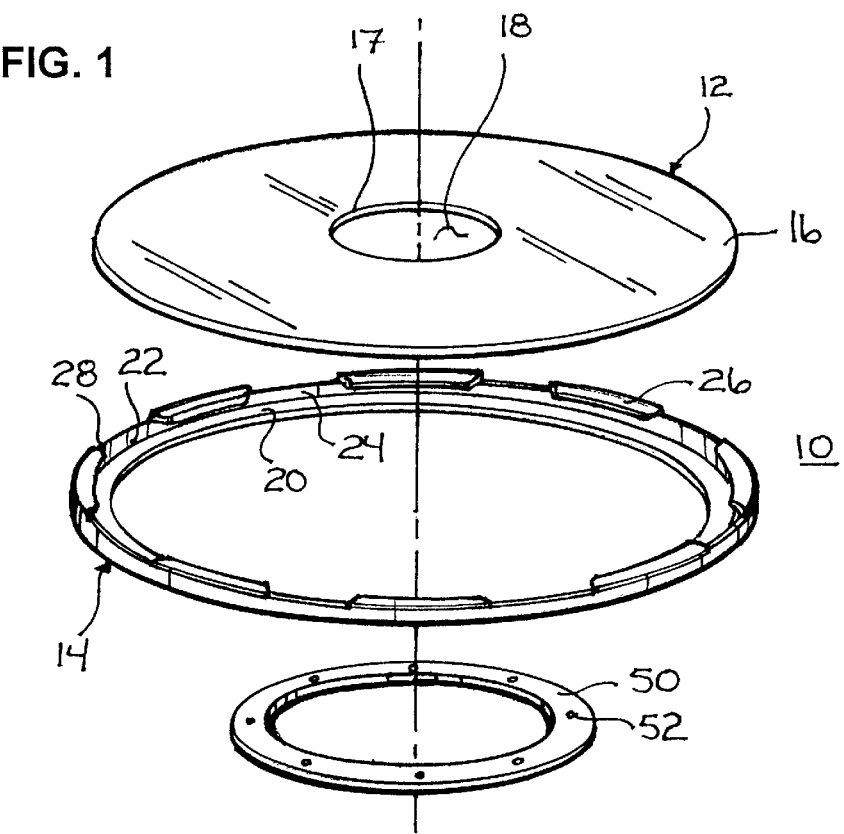
FIG. 1 is an exploded view in perspective of a protective disk cover according to the present invention.
Figure 2:
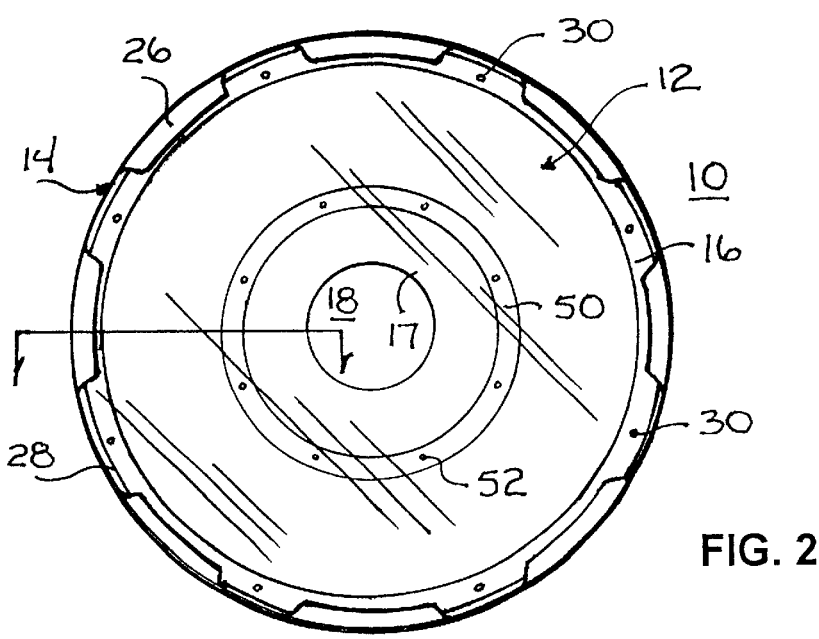
FIG. 2 is top plan view of the protective cover of FIG. 1.
Figure 3:
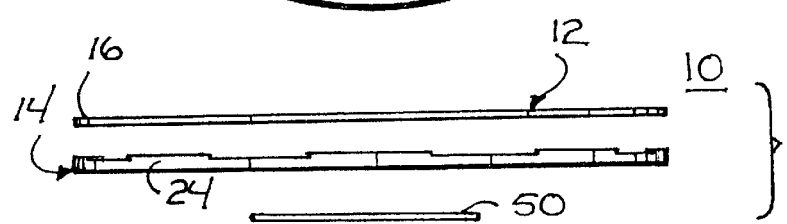
FIG. 3 is an exploded side view of the disk cover of FIGS. 1 and 2.
Figure 6:
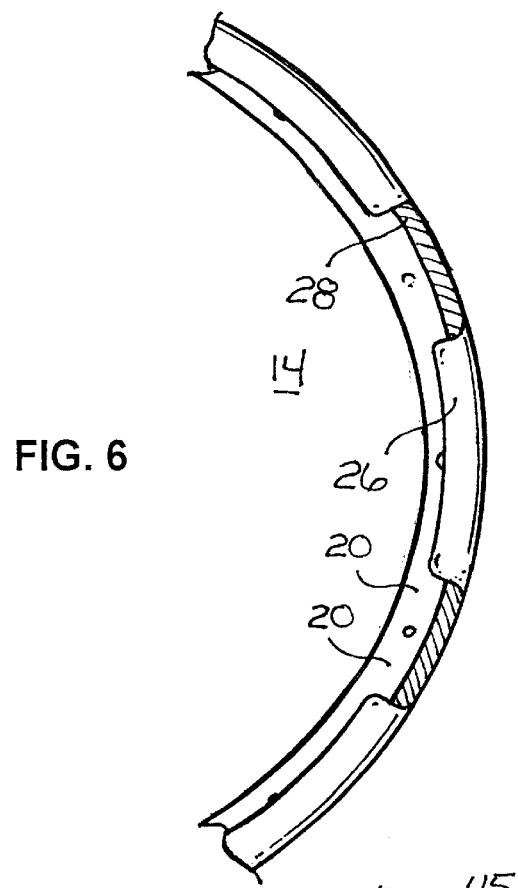
FIG. 6 is an enlarged partial sectional top view of the frame of the disk cover.

Turning now to the drawings in which like reference characters indicate corresponding elements throughout the several views, attention is first directed to FIGS. 1, 2 and 3 which illustrate a protective disk cover, generally designated 10. Cover 10 includes a generally planar, circular shield portion 12 and an annular, circumferential frame 14. Shield portion 12 and frame 14 can be formed of various materials, but are preferably formed of a plastic material such as polyester, vinyl, polycarbonate, etc. As will become apparent from the continuing description, frame 14 is fabricated using a proprietary molding technique which enables forming undercut elements. Shield portion 12 has an outer edge 16 and an inner edge 17 defining a central opening 18 and is transparent to the optical reading device employed to retrieve data from optical disks. With additional reference to FIG. 6, frame 14 includes a generally planar annular base 20 extending radially inwardly from a lower edge 22 of a circumferential end wall 24. End wall 24 is a continuous ring to provide rigidity and strength to frame 14. A plurality of evenly spaced tabs 26 extend radially inwardly from an upper edge 28 of end wall 24. Frame 14 does not interfere with a readable portion of a disk, as will be described presently, and therefore, can be formed of transparent or opaque material. The use of opaque materials permits frames 14 to be colored as desired.

Shield portion 12 resides within frame 14, with outer edge 16 overlying and being supported by annular base 20. Shield portion 12 can be free floating within frame 14, or, to reduce chance of loss of shield portion 12, shield portion 12 can be attached to frame 14 at affixed points 30 on annular base 20. Affixed points 30 are limited locations corresponding to areas of annular base 20 between tabs 26. The positioning of affixed points 30 permits flexing and expansion of end wall 24 and tabs 28 relative shield portion 12. This allows insertion of an optical disk. Affixed points 30 can be formed by using a thermal bond, impulse or sonic spot welding device 31, as illustrated in FIG. 4, adhesives, or other methods of attachment limited to small portions, etc.

Figure 5:
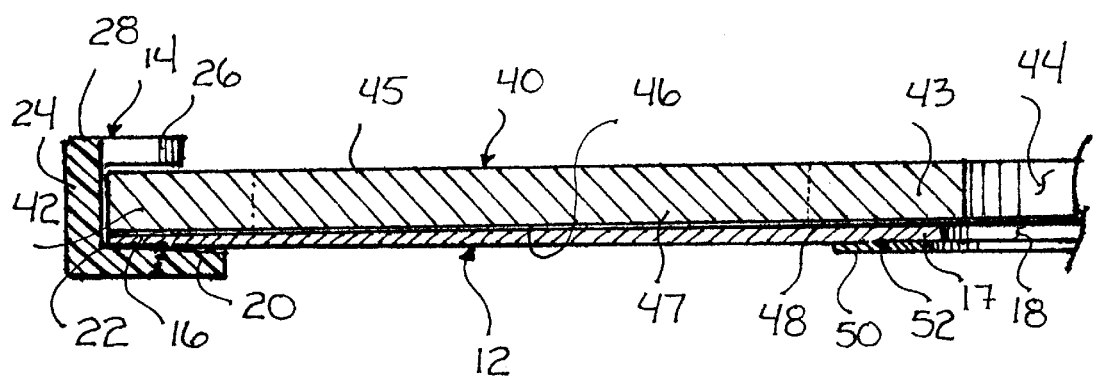
FIG. 5 is an enlarged partial sectional side view of the disk cover disk cover attached to a disk.
Figure 7:
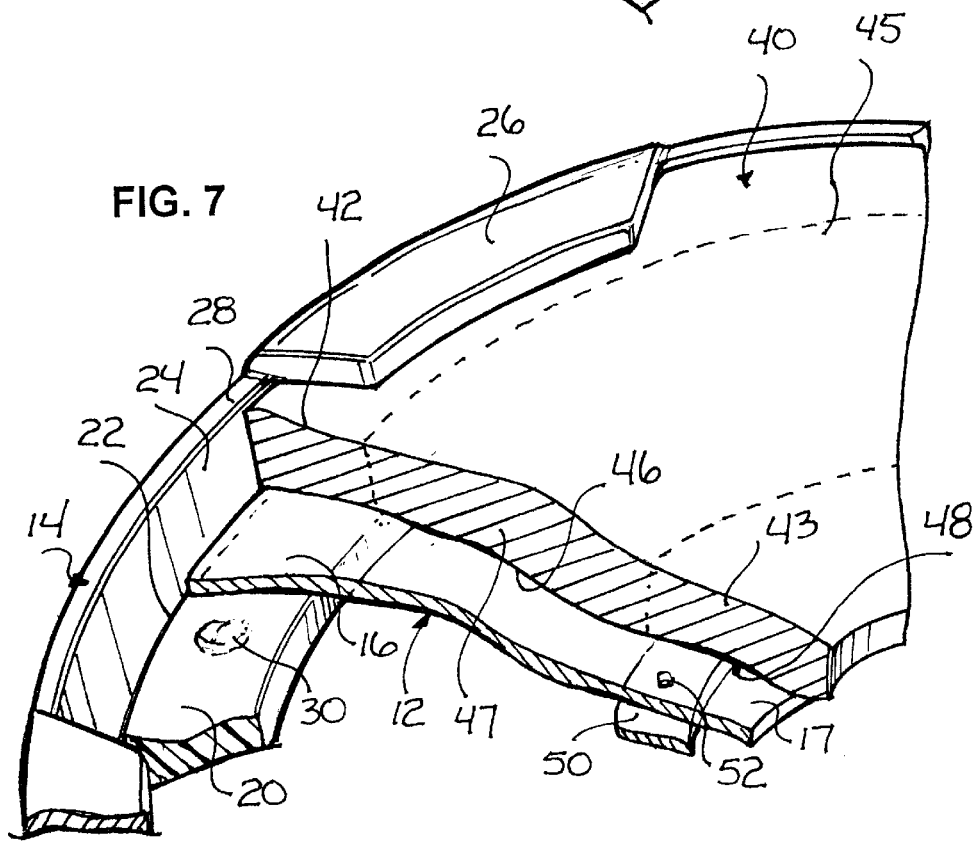
FIG. 7 is an enlarged partial perspective view of the protective disk cover and disk, with portions removed.

With additional reference to FIGS. 5 and 7, an optical disk 40 is received within frame 14, overlying shield portion 12 and retained by tabs 26. Optical disk 40 includes an outer edge 42, an inner edge 43 defining a center hole 44, a top surface 45, a readable or bottom surface 46 having a readable portion 47 intermediate outer edge 42 and inner edge 43, as designated by broken lines, and a protruding ring 48 projecting from bottom surface 46. Protruding ring 48 encircles center hole 44 and is positioned intermediate readable portion 47 and center hole 44. Protruding ring 48 is variably positioned between readable portion 47 and center hole 44, the diameter thereof depending upon the manufacturer. Details of disk 40 will not be elaborated upon, as they are well known in the art. It will be understood that disk 40 can be substantially any type of optically read digital data disk, such as CD, DVD, CD-ROM, mini disks, etc.

Annular base 20 extends radially inwardly to support shield portion 12 and disk 40. To prevent obscuring or otherwise degrading access to the data stored on disk 40, annular base 20 terminates radially inwardly at a position relative disk 40 intermediate outer edge 42 and readable portion 47. Annular base 20 also acts as a protective structure for shield portion 12. When laid on a flat surface, annular base 20 raises shield portion 12 off of the surface preventing damage thereto. End wall 24 is of a height sufficient to closely accommodate shield portion 12 and disk 40 between annular base 20 and tabs 26. Shield portion 12 corresponds to and is for covering and protecting bottom surface 46 of disk 40. Central opening 18 is formed to closely correspond to center hole 44 of disk 40, although some variation can occur. Shield portion 12 can include variations in central opening 18 to end outside of or inside of protruding ring 48. If central opening 18 ends inside of protruding ring 48, shield portion 12 can include a groove to accommodate protruding ring 48. These variations are described in detail in co-pending U.S. patent application Ser. No. 10/186,514, filed 1 Jul. 2002, entitled *Protective Cover for Optically Read Digital Disks*, which is hereby incorporated by reference. In the preferred embodiment, shield portion 12 can be sufficiently thin to conform to protruding ring 48 without the need for a groove. Additionally, inner edge 17 can be reinforced by an annular ring 50 affixed at spots 52, in the same manner as frame 14, such as by thermal or sonic spot wells, adhesives, etc. Ring 50 can be substantially at or spaced from inner edge 17 and be inside or outside of protruding ring 48, depending on the position of inner edge 17 relative disk 40. If positioned outside protruding ring 48 (relative disk 40), care must be taken not to cover readable portion 47. It will be understood that ring 50 is an optional element and not necessary to cover 10.

Figure 4:
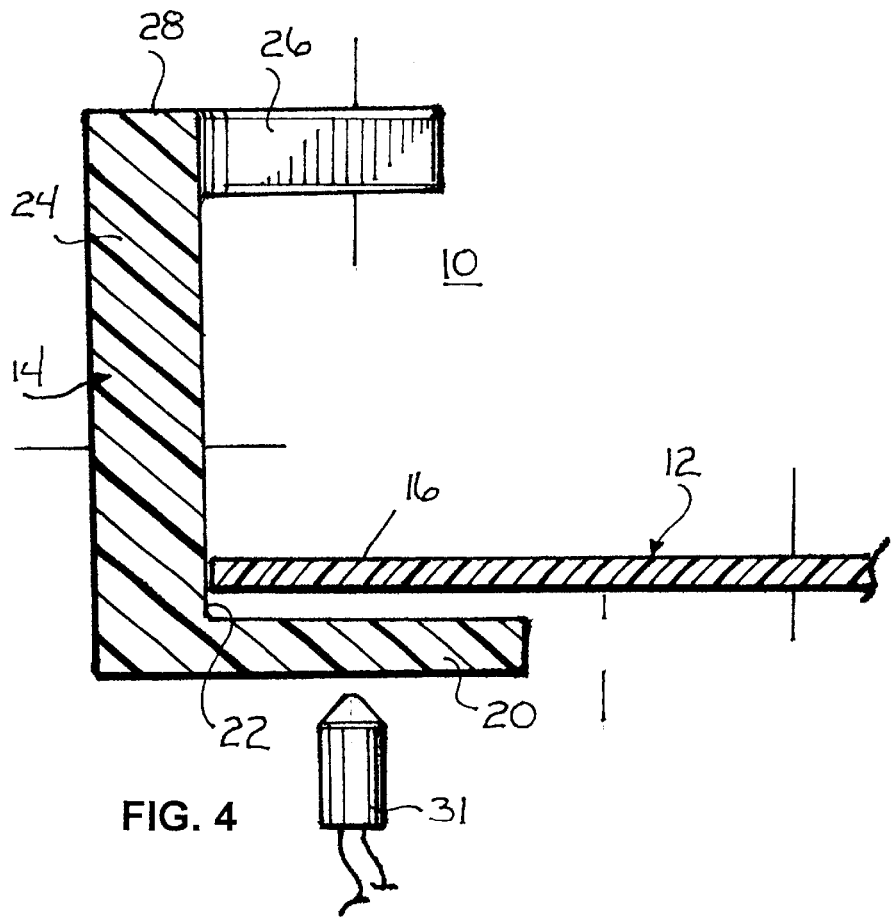
FIG. 4 is a greatly enlarged partial sectional side view of the disk cover of FIGS. 1 and 2.

Referring now to FIG. 4, frame 14 is sized and dimensioned to be receivable in optical disk reading devices, and provide rigidity for secure engagement with disk 40. Strength and rigidity are provided primarily by continuous end wall 24 which can be relatively thick, such as greater than 0.010 inches thick, as it does not affect the thickness of disk 40, only the width. Annular base 20 is relatively thin, such as 0.005 inches thick, and tabs 28 are as thin as 0.008 inches thick. Shield portion 12 is from 0.002 inches to 0.005 inches thick. The thicker shield works well for audio and single layer data storage. However, multi-layer data storage disks, such as DVDs, require the thinnest shield in order to be read properly. In this manner, cover 10 can be snapped over the readable side of disk 40 with tabs 26 engaging top surface 45. Frame 14, while sufficiently rigid for close and secure engagement of disk 40, is sufficiently flexible to allow momentary distortion of the structure and allow tabs 26 to engage the rim of a disk. The distortion is made possible by the free floating or limited attachment of shield portion 12 to frame 14.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A protective cover for protecting a read side of an optical disk comprising:
   a circumferential frame for receiving and engaging the optical disk, the frame including a continuous end wall having an upper edge and a lower edge, an annular base extending radially inwardly from the lower edge and a plurality of spaced apart tabs extending radially inwardly from the upper edge for engaging an upper surface of an optical disk; and
   a substantially planar shield being transparent and having an inner edge defining a central opening, an outer edge and a generally planar annular surface extending between the outer edge and the inner edge, the shield affixed to one of an inner surface and an outer surface of the annular base at affixed points positioned intermediate the tabs, the annular base for receiving and covering the read side of the optical disk.

2. A protective cover as claimed in claim 1 wherein the shield is affixed to the annular base by one of thermal bonds, impulse or sonic spot welds and adhesives.

3. A protective cover as claimed in claim 2 wherein the frame is flexible at the tabs relative the shield.

4. A protective cover as claimed in claim 1 wherein the frame is molded.

5. A protective cover for protecting a read side of an optical disk comprising:

a circumferential frame for receiving and engaging the optical disk, the frame including a continuous end wall having an upper edge and a lower edge, an annular base extending radially inwardly from the lower edge and a plurality of spaced apart tabs extending radially inwardly from the upper edge for engaging an upper surface of an optical disk;

a substantially planar shield being transparent and having an inner edge defining a central opening, an outer edge and a generally planar annular surface extending between the outer edge and the inner edge, the shield carried by the annular base for receiving and covering the read side of the optical disk; and a ring affixed to the inner edge of the shield.

6. A protective cover as claimed in claim 5 wherein the ring is affixed to the annular base by one of thermal bonds, impulse or sonic spot welds and adhesives.

7. An optical disk comprising:

an outer edge;

a center hole;

an upper surface;

a readable surface having a readable portion intermediate the outer edge and the center hole;

a protective cover removably covering the readable surface, the protective cover comprising:

a circumferential frame including a continuous end wall having an upper edge and a lower edge, an annular base extending radially inwardly from the lower edge and a plurality of spaced apart tabs extending radially inwardly from the upper edge and overlying and engaging the upper surface of the disk, the annular base terminates radially inwardly at a position intermediate the outer edge and the readable portion of the disk; and a substantially planar shield being transparent and having an inner edge defining a central opening, an outer edge and a generally planar annular surface extending between the outer edge and the inner edge, the shield affixed to one of an inner surface and an outer surface of the annular base at affixed points positioned intermediate the tabs, the annular base and carrying and covering the read side of the optical disk.

8. An optical disk as claimed in claim 7 wherein the shield is affixed to the annular base by one of thermal bonds, impulse or sonic spot welds and adhesives.

9. An optical disk as claimed in claim 7 wherein the frame is molded.

10. An optical disk as claimed in claim 7 further including a ring affixed to the inner edge of the shield.

11. An optical disk as claimed in claim 10 wherein the ring is affixed to the annular base by one of thermal bonds, impulse or sonic spot welds and adhesives.

\* \* \* \* \*